United States Patent [19]
Humiston

[11] 3,893,894
[45] July 8, 1975

[54] LOW TEMPERATURE WATER PURIFICATION SYSTEM

[75] Inventor: Gerald F. Humiston, South Barre, Vt.

[73] Assignee: Pollution Control, Inc., South Barre, Vt.

[22] Filed: June 13, 1973

[21] Appl. No.: 369,515

[52] U.S. Cl. ............... 202/235; 203/11; 203/100; 159/6 W; 159/1 C; 159/24 R; 159/24 A; 159/DIG. 32
[51] Int. Cl. ........ B01d 3/00; B01d 3/10; B01d 1/22
[58] Field of Search ..... 159/24 A, 17 VS, 6 W, 1 C, 159/24 R, 24 B, 17 R; 203/10, 11, 100; 202/235

[56] References Cited
UNITED STATES PATENTS

| | | | |
|---|---|---|---|
| 1,216,187 | 2/1917 | Trump | 159/17 X |
| 1,284,945 | 11/1918 | Swan | 159/25 A X |
| 1,465,020 | 8/1923 | Monti | 159/24 A |
| 1,932,214 | 10/1933 | Hornschuch | 415/170 B UX |
| 2,631,926 | 3/1953 | Eckstrom | 159/17 R X |
| 2,777,514 | 1/1957 | Eckstrom | 159/24 A X |
| 2,806,433 | 9/1957 | La Bour | 415/170 B UX |
| 3,118,775 | 1/1964 | Byer et al. | 159/20 R UX |
| 3,615,184 | 10/1971 | Gehrig et al. | 159/47 R |
| 3,725,206 | 4/1973 | Foley | 159/24 R X |

FOREIGN PATENTS OR APPLICATIONS

| | | | |
|---|---|---|---|
| 650,047 | 12/1935 | Germany | 159/24 B |
| 236,076 | 6/1911 | Germany | 159/2 MS |

*Primary Examiner*—Jack Sofer

[57] ABSTRACT

A low temperature purification system is provided which is particularly adapted for use to mechanically purify in a continuous operation solutions containing solids and dissolved substances. The purification system includes a solution supply means, and a centrifugal vacuum evaporator to which the solution to be purified is fed from the solution supply means. Drive means are operatively connected to the evaporator for subjecting the solution within the evaporator to centrifugal acceleration thereby causing the solids in the solution to be displaced outwardly of the axis of rotation of the solution and the liquid of the solution is displaced inwardly toward the axis of rotation. Outlet means are embodied in the evaporator for discharging the solids therefrom. The liquid as it is being displaced inwardly is simultaneously subjected to vacuum distillation thereby to produce vapor. This vapor in turn is conducted to a condenser means where the vapor is condensed to a substantially pure liquid. Heat pump means are provided in the system between the centrifugal vacuum evaporator and the condenser means. The heat pump means is operable to transfer the heat of condensation absorbed by the condenser means back to the centrifugal vacuum evaporator thereby to supply heat to the solution in the evaporator to replace the heat loss therefrom as the liquid is transformed to vapor whereby to maintain the temperature of the solution within the evaporator substantially constant. The system includes means for providing heat energy in the solution being introduced to the vacuum evaporator to provide a minimum temperature in the body of the solution within the evaporator and to compensate for heat losses within the system.

5 Claims, 2 Drawing Figures

3,893,894

LOW TEMPERATURE WATER PURIFICATION SYSTEM

BACKGROUND OF THE INVENTION

As is recognized by all, many applications exist which require the use of solutions from which solids and dissolved substances have been separated. Many processes have been developed heretofore for purposes of accomplishing this function of separation. One technique which has commonly been employed to remove solids from a solution is centrifugal separation. However, although centrifugal separation has proven to be highly effective for separating solids from a solution, it is not a particularly useful technique for the removal of dissolved substances from a solution and may even promote the retention of the dissolved substances therein. Another problem associated with the technique of centrifugal separation is that extremely high levels of centrifugal acceleration require high speeds of rotation to produce the desired separation within a reasonable period of time.

Another technique which is well known in the prior art which has been employed for purposes of purifying solutions is that of vacuum distillation. Vacuum distillation is often effective in removing solid substances from a solution because, as the solution is continuously evaporated, the dissolved substances accumulate and eventually supersaturate out of solution, thereby becoming just one more solid to be removed. One of the problems encountered with vacuum distillation, however, is that large concentrations of solids interfere with the surface evaporation rates thereby slowing down the process. Another difficulty has been adequately providing for the continuous removal of the solids remaining after the solution has been distilled. Another problem associated with the technique has been the difficulty of exposing sufficient surface area of the solution to the vacuum to achieve an acceptable rate of evaporation.

In an effort to obviate the difficulties described hereinabove which characterize the techniques of centrifugal separation as well as that of vacuum distillation, a process and apparatus adapted to provide for the continuous mechanical purification of a solution containing solids and dissolved substances therein has been developed, and comprises the subject matter described and claimed in copending patent application, Ser. No. 303,425, filed on Nov. 3, 1972, which is entitled "Liquid Purification Apparatus and Process", now U.S. Pat. No. 3,837,491 granted Sept. 24, 1974. The apparatus described therein is operable for separating the solids and the dissolved substances from the solution in a rapid and economical manner, and provides for the effective removal of the separated solids. This is accomplished by subjecting the solution simultaneously to both centrifugal separation and vacuum distillation.

The mode of operation of the apparatus of the aforereferenced copending patent application is such that the temperature of the solution therein will drop as the latent heat of vaporization drains heat from the solution as liquid is vacuum boiled off the solution. As a result heat must be added to the solution to replace the loss thereof in order to maintain a constant temperature for the solution present in the apparatus. Since the liquid which is vaporized is subsequently condensed, and since the heat produced during condensation equals the loss of heat occurring during vaporization, it is therefor desirable to provide a system in which the apparatus is associated with means operable for transferring the heat from condensation to replace the heat loss which takes place therein. The present invention is directed to a system embodying such a means.

Accordingly, it is an object of the present invention to provide a novel and improved low temperature purification system which is operable to mechanically purify a solution in a continuous operation by separating therefrom the solids and dissolved substances contained therein.

It is also an object of the present invention to provide such a low temperature purification system which eliminates the need to provide an external heat source for supplying heat to offset the heat loss which occurs during vaporization.

It is another object of the present invention to provide such a low temperature purification system wherein a means is provided that is operable to replace the heat, that is lost during the vaporization of the liquid of the solution to form liquid vapor, by transferring back to the solution the heat that is produced when this liquid vapor is condensed whereby to maintain the temperature of the solution substantially constant.

It is still another object of the present invention to provide such a low temperature purification system wherein the heat transfer means is operatively connected in the system between the vaporizing means and the condensing means.

A further object of the present invention is to provide such a low temperature purification system wherein the condensing means is connected in the system between the means wherein the liquid of the solution is vaporized and the vacuum pump which is operable to pump the liquid vapor whereby to enable a smaller size vacuum pump to be utilized in the system since the major portion of the vacuum pumping can then be accomplished as a result of the condensation process.

Yet another object of the present invention is to provide such a low temperature purification system which is highly effective to purify solutions by removing therefrom solids and dissolved substances contained therein while yet embodying components which are relatively inexpensive to manufacture and relatively easy to employ.

SUMMARY OF THE INVENTION

It has now been found that the foregoing and related objects can be readily attained in a novel and improved low temperature purification system which is particularly adapted to be used for mechanically purifying a solution separating therefrom solids and dissolved substances contained therein. The purification system includes a centrifugal vacuum evaporator, means for supplying to the evaporator solution to be purified, and drive means operatively connected to the evaporator for subjecting the solution contained therein to centrifugal acceleration thereby to displace the solids contained therein outwardly from the axis of rotation of the rotating portion of the evaporator. The system also includes outlet means connected to the evaporator operable for discharging separated solids therefrom. As a result of the centrifugal acceleration which is imparted to the solution, while the solids are being displaced outwardly the liquid having dissolved substances therein is displaced inwardly toward the aforementioned axis of rotation. This liquid is then subjected to vacuum distillation whereby the liquid is vaporized and the substances which have been dissolved therein are separated out as solids and are discharged from the evaporator in the same manner as that previously described for the other solids. The liquid vapor is fed to a condenser wherein the vapor is condensed to provide pure liquid. Means are embodied in the system for removing this pure liquid therefrom. In addition, heat pump means are embodied in the system located between the centrifugal vacuum evaporator and the condenser. The heat pump means is operable to transfer the heat of condensation absorbed by the condenser back to the centrifugal vacuum evaporator thereby to supply heat to the solution in the evaporator to replace the heat which is lost as the liquid is being vaporized whereby to maintain the temperature of the solution within the evaporator substantially constant.

In accordance with one embodiment of the invention, the low temperature purification system embodies a heat pump means which comprises a heat exchanger and a heat pump motor and compressor. The operation of this heat pump means is such that refrigerant released as a gas through an expansion valve sub-cools the coils within the condenser before reaching the compressor where the gas is compressed. The refrigerant after compression, which is at an elevated temperature, is passed through a heat exchanger where it is cooled by the solution being charged to the centrifugal vacuum evaporator, which is independently pumped through the heat exchanger. The solution in turn is heated by the refrigerant and being charged to the evaporator. As the compressed refrigerant loses heat to the solution it changes to a liquid, and the cycle is repeated. Therefore, it can be seen that heat from the condenser is thus effectively transferred back to the centrifugal vacuum evaporator, thereby eliminating or minimizing the need for an external heat source at the vacuum evaporator. Also, in accord with the embodiment of the invention, the condenser is located in the system between the centrifugal vacuum evaporator and the vacuum pump. Recognizing that water when vaporized expands to a larger volume in the gaseous state as compared to the liquid, a large vacuum pump must be provided to pump the large gaseous volume which represents a relatively small amount of liquid. However, if the water vapor could be condensed before reaching the vacuum pump, the size of the vacuum pump could be materially reduced. Moreover, if the water vapor could be condensed before reaching the vacuum pump, the condensing of the water vapor would essentially be creating the vacuum load on the centrifugal vacuum evaporator. Therefore, by locating the condenser between the centrifugal vacuum evaporator and the vacuum pump, the major portion of the vacuum pumping is done as a result of the condensation process thereby leaving the prime function of the vacuum pump to be removal of any non-condensibles which might be released during the evaporation process, and the removal from the system of any air leakage.

In accord with another form of the invention, the heat pump means include a blower which is located between the centrifugal vacuum evaporator and the condenser whereby to be positioned in the path of flow of the liquid which has been vaporized. The blower is operable to increase the saturation pressure of the liquid vapor. As the saturation pressure is increased, the temperature of the vapor also increases. Therefore, when the vapor is substantially condensed in the condenser more heat is produced during the condensation process the higher the saturation pressure of the vapor. Thus, the use of such a blower comprises another way of eliminating or minimizing the need to provide an external heat source for adding heat to the solution to maintain the temperature thereof in the evaporator substantially constant.

DETAILED DESCRIPTION OF THE ILLUSTRATED EMBODIMENTS

Figure 1:
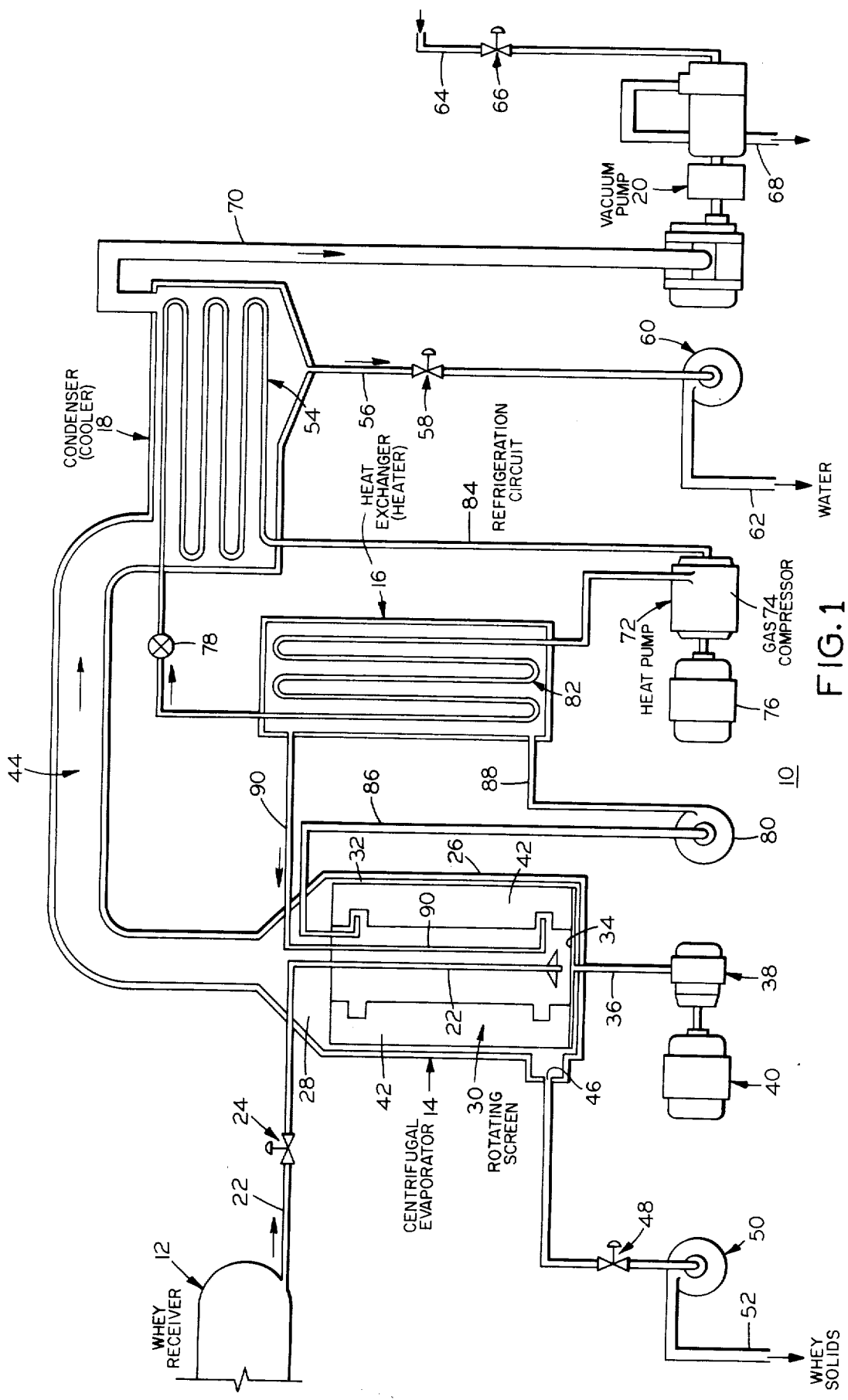
FIG. 1 is a schematic flow diagram of a low temperature purification system constructed in accordance with the present invention illustrating one form of heat pump means embodied therein.

Referring now to the drawings, and more particularly FIG. 1 thereof, there is illustrated therein one embodiment of a low temperature purification system, generally designated by the reference numeral 10, constructed in accordance with the present invention. The system 10 in a manner to which reference will be had more fully hereinafter functions to mechanically purify solutions by separating therefrom the solids and dissolved substances contained therein. More specifically, the system 10 as depicted in FIG. 1 is particularly adapted to be employed to separate water from a solution containing whey and water whereby the outputs provided from the system 10 are in the form of whey and water.

The major components of the system 10 illustrated in FIG. 1 of the drawings include a whey receiver 12, a centrifugal vacuum evaporator 14, a heat exchanger 16, a condenser 18, and a vacuum pump 20. The whey receiver 12 functions as a supply source, i.e., a reservoir for the whey solution which is to be purified, i.e., to be separated into whey and pure water as a result of the operation of the system 10. Conduit 22 connects the whey receiver 12 to the centrifugal vacuum evaporator 14 whereby to provide a path of flow therebetween for the solution. As shown in FIG. 1 of the drawings, a regulating valve 24 is preferably provided at a point located along the length of the conduit 22 intermediate the whey receiver 12 and the evaporator 14. The valve 24 is operable to regulate the flow of the whey solution from the whey receiver 12 to the evaporator 14.

With further reference to FIG. 1 of the drawings, the centrifugal vacuum evaporator 14 illustrated therein embodies the same structure as the centrifugal vacuum evaporator which comprises the subject matter of hereinbefore identified copending patent application, Ser. No. 303,425, which was filed on Nov. 3, 1972, and which is entitled "Liquid Purification Apparatus and Process", now U.S. Pat. No. 3,837,491. Therefore, the structure of centrifugal vacuum evaporator 14 is not shown in detail in the drawings and will not be specifically described hereinafter. The only description thereof being included herein is that which is deemed necessary for one to obtain an understanding of the operation of the system 10 of the present invention. Thus, as depicted in FIG. 1, the evaporator 14 includes a stationary housing 26 which is generally cylindrical in shape and defines a generally cylindrically chamber 28 therewithin. A generally cylindrically shaped screen member 30 is mounted for rotation within the chamber 28 and so as to be mounted concentric with the housing 26. The screen member 30 is of a lesser diameter than the interior diameter of the housing 26 and also of a lesser height than the latter thereby to be spaced apart therefrom and to provide an annular spacing 32 therebetween to receive the whey which is separated from the whey solution in a manner yet to be described. Although not depicted in FIG. 1 of the drawings in the interest of maintaining clarity of illustration therein, it is nevertheless to be understood that the screen member 30 is provided with a plurality of small circular perforations suitably dimensioned to permit the whey which is being separated from the whey solution to pass therethrough to the annular spacing 32. The lower portion of the evaporator chamber 28, the conduit 22 with its end within the chamber providing the solution inlet thereto, and receiver 12 constitute the solution intake portion of the purification system.

The screen member 30 is supported within the chamber 28 above the bottom thereof and is mounted for rotation about its axis therein by means of a drive shaft 36 connected to the base 34 of the screen member 30 through the housing 26. The drive shaft 36 in turn is operatively connected to a transmission drive means 38 which is suitably driven by a conventional centrifuge drive motor 40. Motor 40 is suitably selected thereby to be capable of rotating the drive shaft 36 and thereby the screen member 30 at a sufficiently high rate of speed so as to be capable of causing the desired separation operation to take place. A plurality of vanes 42 are integrally formed as a part of the screen member 30 so as to extend inwardly from the side walls of the screen member 30 toward the axis of chamber 28. The vanes 42 are simply radially angled projections which are capable of engaging the whey solutiion and of causing rotation of the solution within the chamber 28. The vanes 42 rotate at high speed to effect centrifugal action within the chamber 28. The solution within the chamber 28, of course, develops the typical cavitational pattern of centrifuged solutions in a vertical chamber, adhering to the screen member 30 at the top thereof and also completely coveriing the base 34 of the screen member 30.

With reference further to FIG. 1 of the drawings, it can be seen therefrom that conduit 22, through which the whey solution is supplied to the evaporator 14 from the receiver 12, passes through the top wall of the housing 26 and extends downwardly into the interior of screen member 30 whereby the whey solution fed from receiver 12 is discharged at a point which is adjacent to the base 34 of screen member 30. Therefore, the whey solution is discharged somewhat below the level of the solution which is in the chamber 28, and accordingly it may be found necessary to feed the whey solution to the evaporator 14 at some positive pressure to prevent reverse flow of the solution from the chamber 28 through the conduit 22 to the receiver 12. The solution is preferably fed into the chamber 28 on a substantially continuous basis. This can be accomplished through proper operation of the aforedescribed regulating valve 24.

Conduit 44 interconnects the top of evaporator 14 with the condenser 18, and as such provides a means whereby a vacuum or reduced pressure is applied to the interior of chamber 28 of evaporator 14. This vacuum causes vaporization to take place of the liquid portion of the whey solution which is the portion thereof which is directed inwardly as a result of the centrifugal action to which the solution is subjected. In the course of time, the dissolved substances which are contained in the liquid portion of the solution which is being directed inwardly, will tend to accumulate within the chamber 28 at the axis thereof, eventually supersaturating the liquid portion of the solution and precipitating out for disposal as solids. The latter solids are then also along with the other solids directed outwardly and pass through the small perforations provided in the screen member 30 into the annular spacing 32.

As depicted in FIG. 1 of the drawings, one end of a solids outlet conduit 46 is connected to the evaporator 14 adjacent to the bottom of housing 26. The conduit 46 is suitably connected to the evaporator 14 so as to be in communication with the annular spacing 32 which is formed between the housing 26 and the screen member 30 thereby to enable the solids passing radially outwardly from the chamber 28 through the perforations in screen member 30 into the annular spacing 32 to drop to the bottom of housing 26 whereby the solids are capable of moving into the outlet conduit 46 for removal from the evaporator 14. The rate at which solids, and more particularly in accordance with the embodiment of the invention being described the rate at which the whey is removed from the evaporator 14 is preferably controlled by means of a regulating valve 48 which is suitably mounted at a point along the length of the conduit 46 intermediate the ends thereof. As illustrated in FIG. 1 of the drawings, the other end of conduit 46 is connected to an outlet pump 50 which is operable for purposes of pumping the whey, i.e., solids discharged from the evaporator 14 through conduit 52 to a suitable receiver therefor (not shown).

Continuing with the description of a low temperature purification system 10 as shown in FIG. 1 of the drawings, the liquid portion of the whey solids is vaporized within the evaporator 14 in the manner described above. The vapors which are formed as a result of this vaporization process pass through conduit 44 into the condenser 18. These vapors which are received in the condenser 18 are made to pass around the coils 54 which are positioned within the condenser 18. In a manner yet to be described, suitable refrigerant is made to flow through the coils 54 which are within the condenser 18. Thus, as the vapors are exposed to the coils 54, the vapors condense to form a "pure" liquid, i.e., water which is substantially free of solids and dissolved substances. The latter water is discharged from the condenser 18 by means of conduit 56. The rate of discharge is preferably controlled by means of regulating valve 58 which is suitably connected in line with the conduit 56 intermediate the ends of the latter. Moreover, in accord with the form of the invention depicted in FIG. 1 of the drawings, a water outlet pump 60 is preferably connected to the other end of conduit 56 and is operable for purposes of pumping the water, which is condensed within the condenser 18, through conduit 62 to a suitable receiving means (not shown) for the water.

As was set forth previously hereinabove, the low temperature purification system 10 also includes a vacuum pump 20. In accord with the embodiment of the invention depicted in FIG. 1 of the drawings, the vacuum pump 20 constitutes a water seal vacuum pump. Seal water is fed to the vacuum pump 20 by means of conduit 64 and the rate of flow thereof is controlled by means of the regulating valve 66. The latter valve 66 is connected in the conduit 64 at a point which is located along the length of the latter and spaced from either end thereof. The outlet for the seal water from the water seal vacuum pump 20 is through conduit 68. Vacuum pump 20 is connected to the condenser 18 by means of conduit 70 whereby the vacuum or reduced pressure established by the vacuum pump 20 is applied to the interior of evaporator 14 where it is operable to cause the liquid portion of the whey solution to be vaporized in the manner previously described.

With reference to FIG. 1 of the drawings, it can be seen therefrom that the condenser 18 is located between the evaporator 14 and the vacuum pump 20 in the system 10. By so locating the condenser 18, it is possible to utilize a smaller size vacuum pump 20 in the system 10 than would be possible if the vacuum pump 20 were connected in the system 10 between the evaporator 14 and the condenser 18. More specifically, as is well-known when water is vaporized, it expands to a larger volume in the gaseous state as compared to the liquid. Consequently, a relatively large vacuum pump must be provided to pump this large gaseous volume which if it were in a liquid state would represent a relatively small amount of liquid. However, if the water vapor is condensed before reaching the vacuum pump, the condensing of the water vapor functions to essentially create the vacuum load which is applied to the centrifugal vacuum evaporator 14. Therefore, by locating the condenser 18 between the evaporator 14 and the vacuum pump 20, the larger portion of the vacuum pumping which takes place in the low temperature purification system 10 is done as a result of the condensation process thereby leaving the prime function of the vacuum pump 20 to be removal of any noncondensibles which might be released during the vaporization process, and the removal from the system of any air leakage.

Because continuous vacuum distillation of the liquid portion of the whey solution by itself may cause cooling of the remaining solution in the chamber 28 with a resultant increase in the viscosity thereof, and because the heat generated by the rapid rotation of the screen member 30 and the friction between the solution and the vanes 42 will ordinarily be insufficient to compensate for such cooling, it is desirable to provide some mechanism by which heat can be positively introduced into the housing 20 of the evaporator 14 above that effective through the rotational action so as to prevent excessive chilling of the solution within chamber 28.

Since the heat given off during condensation of the vapors in the condenser 18 is substantially equal to the heat which is lost during vaporization, a suitable means of transferring this heat produced in the condenser 18 back to the centrifugal vacuum evaporator 14 would be desirable to eliminate the need of employing an external heat source at the centrifugal vacuum evaporator 14 to provide the heat which it is desired be added to the solution. In accord with the embodiment of the invention illustrated in FIG. 1 of the drawings, the means employed in the low temperature purification system 10 for purposes of accomplishing the aforedescribed function of transferring heat from the condenser 18 back to the evaporator 14 comprises the heat pump means 72. The latter heat pump means 72 includes the previously mentioned heat exchanger 16, the compressor 74, the motor 76 which drives the compressor 74, the expansion valve 78, a pump 80, and suitable conduits to which specific reference will be had in the subsequent description.

The method of operation of the heat pump means 72 will now be described. A conventional refrigerant is contained within the coils 82 which are found within the heat exchanger 16. This refrigerant is released as a gas through the expansion valve 78 into the coils 54 of the condenser 18. The coils 54 are cooled by the gas. Inasmuch as the coils 54 are exposed to the vapors which reach the condenser 18 through the conduit 44, the vapors condense into liquid, i.e., water and in doing so heat is given off. This heat functions to heat the refrigerant flowing through the coils 54. The refrigerant flows from the condenser 18 through conduit 84 to the compressor 74 where the gas is compressed. The "hot" compressed refrigerant is then discharged from the compressor 74 into the coils 82. As the refrigerant flows through the coils 82, heat is transferred to the whey solution which is pumped through the heat exchanger 16. The loss of heat causes the compressed refrigerant to cool. The whey solution is pumped by means of pump 80 from the interior of chamber 28 of the evaporator 14 to the heat exchanger 16. For this purpose, conduit 86 connects chamber 28 to one side of pump 80, with conduit 88 serving to connect the other side of pump 80 to the heat exchanger 16. After being heated in the heat exchanger 16, the whey solution is fed back to the evaporator 14 through conduit 90 which interconnects the heat exchanger 16 with the chamber 28. It will be noted with reference to FIG. 1 of the drawings that the conduit 90 serves to discharge the solution near the base 34 of screen member 30 and adjacent to the point where whey solution from the receiver 12 is discharged into the chamber 28. Thus, it can be seen that heat from the condenser 18 is effectively transferred back to the centrifugal vacuum evaporator 14 by the heat pump means 72 thereby eliminating the need for providing an external heat source at the vacuum evaporator 14.

Turning now to a description of the mode of operation of the low temperature purification system 10, whey solution containing solids and dissolved substances therein is fed from receiver 12 to the centrifugal vacuum evaporator 14. Drive shaft 36 which is driven from motor 40 is operable to cause the screen member 30 to rotate at a high rate of speed whereby the solution in chamber 28 is subjected to centrifugal acceleration thereby causing the solids contained therein to be discharged outwardly to the annular spacing 32. The latter solids are discharged from the annular spacing 32 of evaporator 14 through the conduit 46. As a result of the centrifugal acceleration which is imparted to the solution, while the solids are being displaced outwardly the liquid portion of the solution which contains dissolved substances therein is displaced inwardly. This liquid is then subjected to vacuum distillation whereby the liquid portion of the solution is vaporized and the substances which had been dissolved therein are separated out as solids and are discharged from the evaporator 14 in the same manner as the other solids. The vapor is fed to the condenser 18 wherein the vapor is condensed to provide water.

The latter water is discharged from the condenser 18 through the conduit 56. The heat pump means 72 in the manner described in the preceding paragraph is operable to transfer the heat of condensation absorbed by the condenser 18 back to the centrifugal vacuum evaporator 14 thereby to supply heat to the solution in the evaporator 14 to replace the heat which is lost as the liquid portion of the solution is being vaporized whereby to maintain the temperature of the solution in the evaporator 14 substantially constant.

Figure 2:
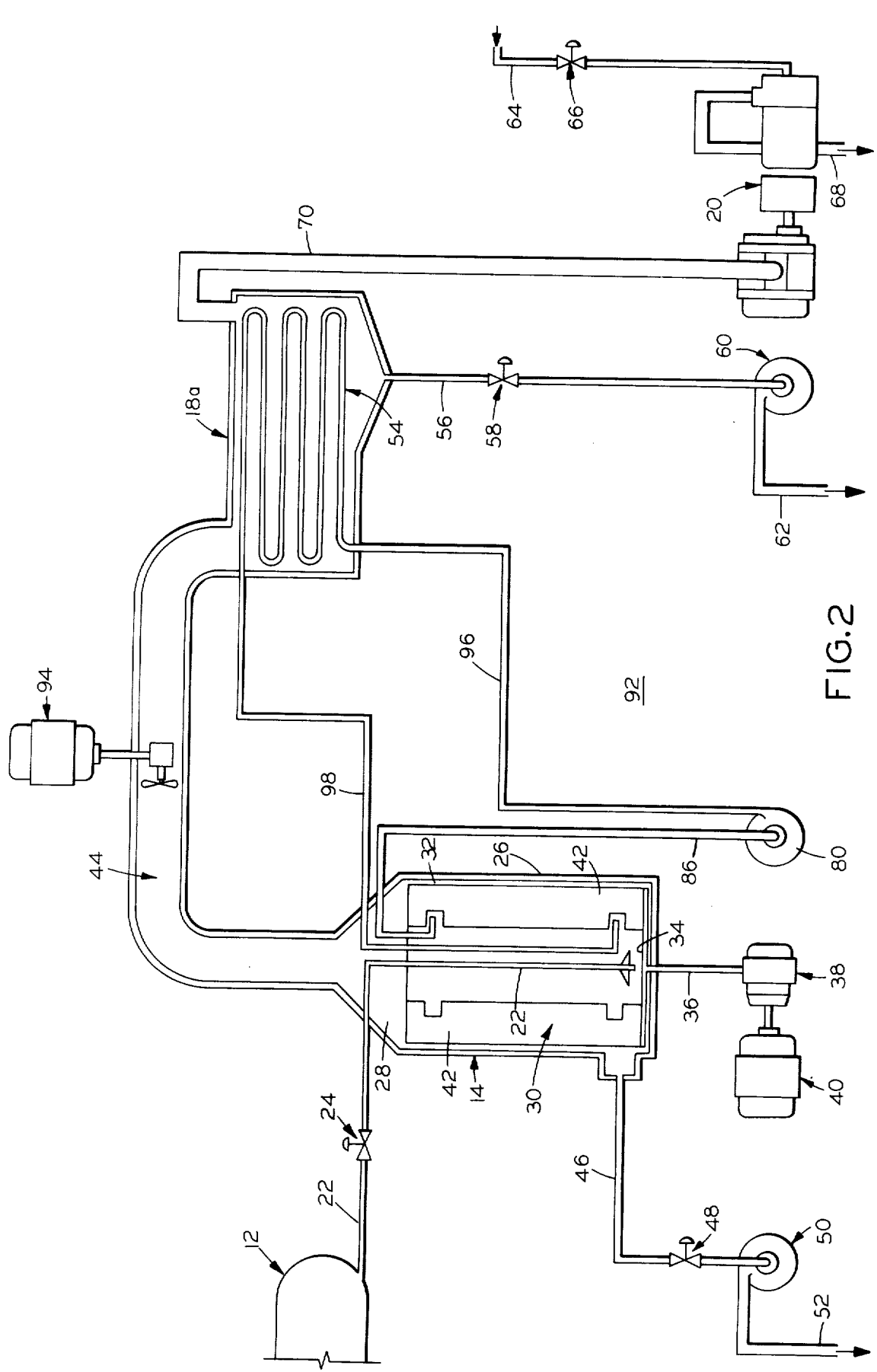
FIG. 2 is a schematic flow diagram of a low temperature purification system constructed in accordance with the present invention illustrating another form of heat pump means embodied therein.

Referring now to FIG. 2 of the drawings, there is illustrated therein another embodiment of the invention. More particularly, there is shown in FIG. 2, a low temperature purification system 92 which is very similar, insofar as concerns the components embodied therein, to the system 10 depicted in FIG. 1 and described hereinabove. Accordiingly, the components which are common to both the system 10 and the system 92 have been designated for ease of understanding in FIGS. 1 and 2 of the drawings by the same reference numerals. Basically the differences which exist between the system 10 shown in FIG. 1 and the system 92 depicted in FIG. 2 reside in the means employed for transferring heat from the condenser 18a back to the centrifugal vacuum evaporator 14 for purposes of adding heat to the solution in the evaporator 14 whereby to maintain the solution at a substantially constant temperature. In the system 10 as was described above, the heat transfer is accomplished by pumping the solution through the heat exchanger 16 wherein the solution is exposed to the coils 82 located therein which contain a conventional refrigerant, the latter also being caused to flow through the coils 54 of the condenser 18a wherein heat is transferred to the refrigerant. In the system 92, as will be understood with reference to FIG. 2 of the drawings, heat transfer is achieved by pumping the solution from the chamber 28 directly to the condenser 18a and by mounting a blower 94 in the conduit 44 for a purpose yet to be described, thereby eliminating from the system 92 the expansion valve 78 and the heat exchanger 16 which are embodied in the system 10 of FIG. 1 as well as the use therein of the aforedescribed refrigerant.

More specifically, in system 92 the pump 80 is operable for purposes of pumping the solution from the evaporator 14 through the coils 54 of the condenser 18 wherein the solution is heated and then returned to the evaporator 14. For this purpose, one side of pump 80 is connected by means of conduit 96 to the coils 54 of condenser 18a. The other side of the pump 80 is connected by conduit 86 to the interior of the chamber 28 of evaporator 14 in the same manner as was set forth previously hereinabove in connection with the description of the system 10 of FIG. 1 and the manner in which the conduit 86 and pump 80 are utilized therein. The other end of the coils 54 in condenser 18a is connected by means of conduit 98 to the interior of the chamber 28. It will be noted with reference to FIG. 2 of the drawings that the conduit 98 terminates adjacent the base 34 of the screen member 30 and near the point at which solution from the receiver 12 is discharged into the chamber 28 by the conduit 22.

Turning now to a description of the function of the blower 94, the latter is operable for purposes of increasing the saturation pressure of the vapors which pass through the conduit 44 after being produced in the evaporator 14 in the manner set forth hereinabove in connection with the description of the system 10 in FIG. 1, and before the vapors are condensed by virtue of being exposed to the coils 54 in condenser 18a. As is known to those skilled in the art, raising the saturation pressure of water vapor produces an accompanying increase in the temperature thereof. For example, if the saturation pressure of the water vapor measured at a point in the conduit 44 upstream from the blower 94 is 1.0 psi the temperature of the water vapor will be approximately 101°F. However, if the saturation pressure of the water vapor in the conduit 44 is raised through the action of the blower 94 so that the saturation pressure of the water vapor measured downstream of the blower 94 is increased to 2.0 psi the temperature of the water vapor will be approximately 136°F. Moreover, even if the blower 94 is operable to only increase the saturation pressure to 1.5 psi a temperature rise to approximately 115°F. will still be achieved. It can thus be understood that increasing the saturation pressure of the water vapor as the latter passes through the conduit 44 is effective to increase the amount of heat which will be absorbed in the condenser 18a when the water vapor condenses therein, and thereby as a result the amount of heat which is transferred to the solution flowing in the coils 54 of the condenser 18. The blower 94 and the method of use thereof as described above therefore comprises another means whereby heat is capable of being transferred from the condenser 18a back to the solution which is in chamber 28 of the evaporator 14 to replace the heat loss which occurs in the latter when vaporization occurs therein thereby to maintain the temperature of the solution substantially constant without requiring that the evaporator 14 be provided with some form of external heat source.

Although two embodiments of low temperature purification systems constructed in accordance with the present invention have been shown in the drawings and described hereinabove, it is nevertheless to be understood that other modifications in the construction thereof may still be made thereto by those skilled in the art without departing from the essence of the invention. In this connection, some of the modifications which can be made in the subject low temperature purification systems have been alluded to hereinabove while others will become readily apparent to those skilled in the art when exposed to the present description and illustration of the construction of a low temperature purification system. For example, the low temperature purification systems of the present invention have been described hereinabove as being employed for purposes of separating the solids and dissolved substances contained in a whey solution therefrom, it is to be understood that the purification system of the present invention is also capable of being employed to separate solids and dissolved substances from other types of solution without departing from the essence of the invention. Also, the various operating parameters of the purification system of the present invention can be varied within broad limits without departing from the essence of the present invention to determine and achieve optimal equalibrium conditions. Such operating parameters include the nature, concentration, composition and inflow rate of the solution, the rotational speed of the screen member 30, the operating temperature within the evaporator 14, the rate at which the solids are removed from the evaporator 14, the level of vacuum applied to chamber 28, the degree to which the chamber 28 is filled with solution, etc. Similarly, the rate at which the solution is pumped through the heat exchanger 16 of the purification system 10 and the form of refrigerant employed in the latter system, as well as the rate at which the solution is pumped through the coils 54 of the condenser 18 in the purification system 92 may be varied without departing from the essence of the invention.

Thus, it can be seen that the present invention provides a novel and improved low temperature purification system which is operable to mechanically purify a solution in a continuous operation by separating therefrom the solids and dissolved substances contained therein. Moreover, the low temperature purification system of the present system eliminates the need to provide an external heat source for supplying heat to offset the heat loss which occurs during vaporization since the heat transfer mechanism includes mechanical components providing additional heat energy to offset heat losses from the system. Furthermore, in accord with the present invention a low temperature purification system has been provided wherein a means is provided that is operable to replace the heat that is lost during the vaporization of the liquid of the solution to form vapor, by transferring back to the solution the heat that is produced when this vapor is condensed whereby to maintain the temperature of the solution substantially constant. In the low temperature purification system of the present invention, the heat transfer means is operatively connected in the system between the vaporizing means and the condensing means. In addition, in accordance with the present invention a low temperature purification system has been provided wherein the condensing means is connected in the system between the means wherein the liquid of the solution is vaporized and the vacuum pump which is operable to pump the liquid vapor whereby to enable a smaller size vacuum pump to be utilized in the system since the major portion of the vacuum pumping can then be accomplished as a result of the condensation process. Finally, the low temperature purification system of the present invention is highly effective to purify solutions by removing therefrom solids and dissolved substances contained therein while yet embodying components which are relatively inexpensive to manufacture and relatively easy to employ.

Having thus described the invention, I claim:

1. A low temperature purification system operable for purposes of separating from a solution the solids and dissolved substances contained therein comprising:
   a. a source of supply of a solution containing solids and dissolved substances;
   b. evaporator means connected to said source of supply for receiving solution therefrom, said evaporator means comprising a centrifugal vacuum evaporator operable to separate solids from the solution by centrifugal acceleration and to separate dissolved substances from the solution by vacuum distillation, said centrifugal vacuum evaporator including a stationary housing providing a chamber, a plurality of vanes mounted within said chamber for rotation therewithin, drive means connected to said plurality of vanes operable for causing the rapid rotation thereof, an inlet for solution containing solids and dissolved substances, an outlet for solids adjacent the base of said chamber and an outlet for vapors adjacent the top of said chamber, said inlet for said evaporator means being connected to said source of supply by a conduit, said chamber, conduit and source of supply comprising the solution intake portion of the purification system;
   c. vacuum means operable for producing a vacuum;
   d. condenser means operatively connected between said vapor outlet of said evaporator means and said vacuum means, said condenser means being operable at reduced pressure during operation of said vacuum means and said condenser means in turn producing a reduced pressure within said evaporator means to cause at least a portion of the solution in said evaporator means to vaporize to produce vapors therefrom for transmission to said condenser means, said condenser means including a coil supported therewithin in the path of flow of the vapors received from said evaporator means, said coil being connected into a heat pump closed loop flow path so as to receive a heat transfer refrigerant fluid at a temperature below the condensation temperature of the vapors in said condenser to cause the vapors coming into contact with said coil to condense and thereby produce condensate with the heat produced during condensation being absorbed by the fluid flowing through said coil;
   e. outlet means connected to said condenser means for discharging the condensate therefrom; and
   f. a refrigerant fluid compressor means and an additional coil connected in series in said heat pump loop, said additional coil comprising part of an indirect heat transfer means operatively connected in another closed loop with said evaporator means to transfer the heat of condensation from said condenser means through said additional coil to solution being introduced into said evaporator means, said heat transfer means including pumping and conduit means for transporting at least a portion of the solution containing solids and dissolved substances from a point of supply in said solution intake portion and into heat exchange with the heat transfer fluid to transfer heat of condensation to that portion of the solution and effect an increase in the temperature thereof, said pumping means and conduit then transporting the heated solution to said vacuum centrifugal evaporator to prevent reduction of the temperature of the body of the solution within said evaporator as evaporation takes place, said heat transfer means including mechanical means providing additional heat energy in the solution being introduced to said vacuum evaporator to provide a preselected minimum temperature in the body of the solution within said centrifugal vacuum evaporator during evaporation and to compensate for heat losses within the system.

2. The low temperature purification system as set forth in claim 1 further including outlet means connected to said centrifugal vacuum evaporator for discharging solids therefrom.

3. The low temperature purification system as set forth in claim 1 wherein said vacuum means comprises a water seal vacuum pump, inlet means connected to said water seal vacuum pump for supplying seal water thereto and, outlet means connected to said water seal vacuum pump for discharging seal water therefrom.

4. The low temperature purification system as set forth in claim 1 wherein said heat transfer means provides indirect heat exchange contact between the condensing vapors in said condenser means and the solution being heated and wherein it includes an indirect heat exchanger having said additional coil supported therein, an expansion valve having one side thereof connected to one end of said additional coil supported in said heat exchanger and the other side thereof connected to one end of said first mentioned coil supported in said condenser means, said compressor means having one side thereof connected to the other end of said coil supported in said heat exchanger and the other side thereof connected to the other end of said first mentioned coil supported in said condenser means thereby establishing said heat pump closed loop flow path between said coil in said heat exchanger, said expansion valve, said first mentioned coil in said condenser means and said compressor means through which said refrigerant is made to flow with the refrigerant being released as a gas from said expansion valve into said first mentioned coil in said condenser means, the refrigerant absorbing heat as the refrigerant flows through said coil in said condenser means, the refrigerant then flowing to said compressor means wherein the refrigerant is compressed and made to flow to and through said coil supported in said heat exchanger wherein the refrigerant gives up heat, from said coil in said heat exchanger the refrigerant flows back to said expansion valve to initiate another cycle, and wherein said pumping and conduit means comprises pump means, first conduit means means connecting one side of said pump means to said point of supply of solution to be heated, second conduit means connecting the other side of said pump means to the solution side of said heat exchanger, and third conduit means connecting the solution side of said heat exchanger to said centrifugal vacuum evaporator thereby establishing said another closed loop flow path between said point of supply, centrifugal vacuum evaporator, said heat exchanger, and said pump means by means of said first, second and third conduit means through which solution is pumped through said heat exchanger wherein the solution is heated as a result of a heat transfer from the refrigerant flowing through said coil in said heat exchanger thereby increasing the temperature of the solution before the latter is charged to said centrifugal vacuum evaporator wherein the heated solution mixes with the solution in said centrifugal vacuum evaporator to effect direct heat transfer therewithin, said refrigerant fluid compressor means providing additional heat energy to the solution.

5. A low temperature purification system operable for purposes of separating from a solution the solids and dissolved substances contained therein comprising:

a. a source of supply of a solution containing solids and dissolved substances;

b. evaporator means connected to said source of supply for receiving solution therefrom, said evaporator means comprising a centrifugal vacuum evaporator operable to separate solids from the solution by centrifugal acceleration and to separate dissolved substances from the solution by vacuum distillation, said centrifugal vacuum evaporator including a stationary housing providing a chamber, a plurality of vanes mounted within said chamber for rotation therewithin, drive means connected to said plurality of vanes operable for causing the rapid rotation thereof, an inlet for solution containing solids and dissolved substances, an outlet for solids adjacent the base of said chamber and an outlet for vapors adjacent the top of said chamber, said inlet for said evaporator means being connected to said source of supply by a conduit, said chamber, conduit and source of supply comprising the solution intake portion of the purification system;

c. vacuum means operable for producing a vacuum;

d. condenser means operatively connected between said vapor outlet of said evaporator means and said vacuum means, said condenser means being operable at reduced pressure during operation of said vacuum means and said condenser means in turn producing a reduced pressure within said evaporator means to cause at least a portion of the solution in said evaporator means to vaporize to produce vapors therefrom for transmission to said condenser means, said condenser means including a coil supported therewithin in the path of flow of the vapors received from said evaporator means, said coil containing a refrigerant flowing therethrough having a temperature sufficient to cause the vapors coming into contact with said coil to condense to produce a condensate with the heat produced during condensation being absorbed by the refrigerant flowing through said coil;

e. outlet means connected to said condenser means for discharging the condensate therefrom; and f. heat pump means comprising a heat exchanger having another coil supported therein, an expansion valve having one side thereof connected to one end of said another coil supported in said heat exchanger and the other side thereof connected to one end of said first mentioned coil supported in said condenser means, compressor means having one side thereof connected to the other end of said another coil supported in said heat exchanger and the other side thereof connected to the other end of said first mentioned coil supported in said condenser means thereby establishing a first closed loop flow path between said another coil in said heat exchanger, said expansion valve, said first mentioned coil in said condenser means and said compressor means through which the refrigerant is made to flow with the refrigerant being released as a gas from said expansion valve into said first mentioned coil in said condenser means, the refrigerant absorbing heat as the refrigerant flows through said first mentioned coil in said condenser means, the refrigerant then flowing to said compressor means whereby the refrigerant is compressed and made to flow to and through said another coil supported in said heat exchanger wherein the refrigerant gives up heat, from said another coil in said heat exchanger the refrigerant flows back to said expansion valve to initiate another cycle, pump means, first conduit means connecting one side of said pump means to a point of supply of solution containing solids and dissolved pollutants in said solution intake portion, second conduit means connecting the other side of said pump means to said heat exchanger, and third conduit means connecting said heat exchanger to said centrifugal vacuum evaporator thereby establishing a second closed loop flow path between said point of supply, said centrifugal vacuum evaporator, said heat exchanger and said pump means by means of said first, second and third conduit means through which solution is pumped from said point of supply through said heat exchanger wherein the solution is heated as a result of a heat transfer from the refrigerant flowing through said another coil in said heat exchanger thereby increasing the temperature of the solution before the latter is charged to said centrifugal vacuum evaporator wherein the heated solution mixes with the solution in said centrifugal vacuum evaporator to effect direct heat transfer therewithin and cause the temperature of the solution in said centrifugal vacuum evaporator to remain above a preselected minimum temperature as a result of the heat which is lost during vaporization in said centrifugal vacuum evaporator being replaced by the heat which is produced during condensation in said condenser means.

* * * * *